Figure 1:
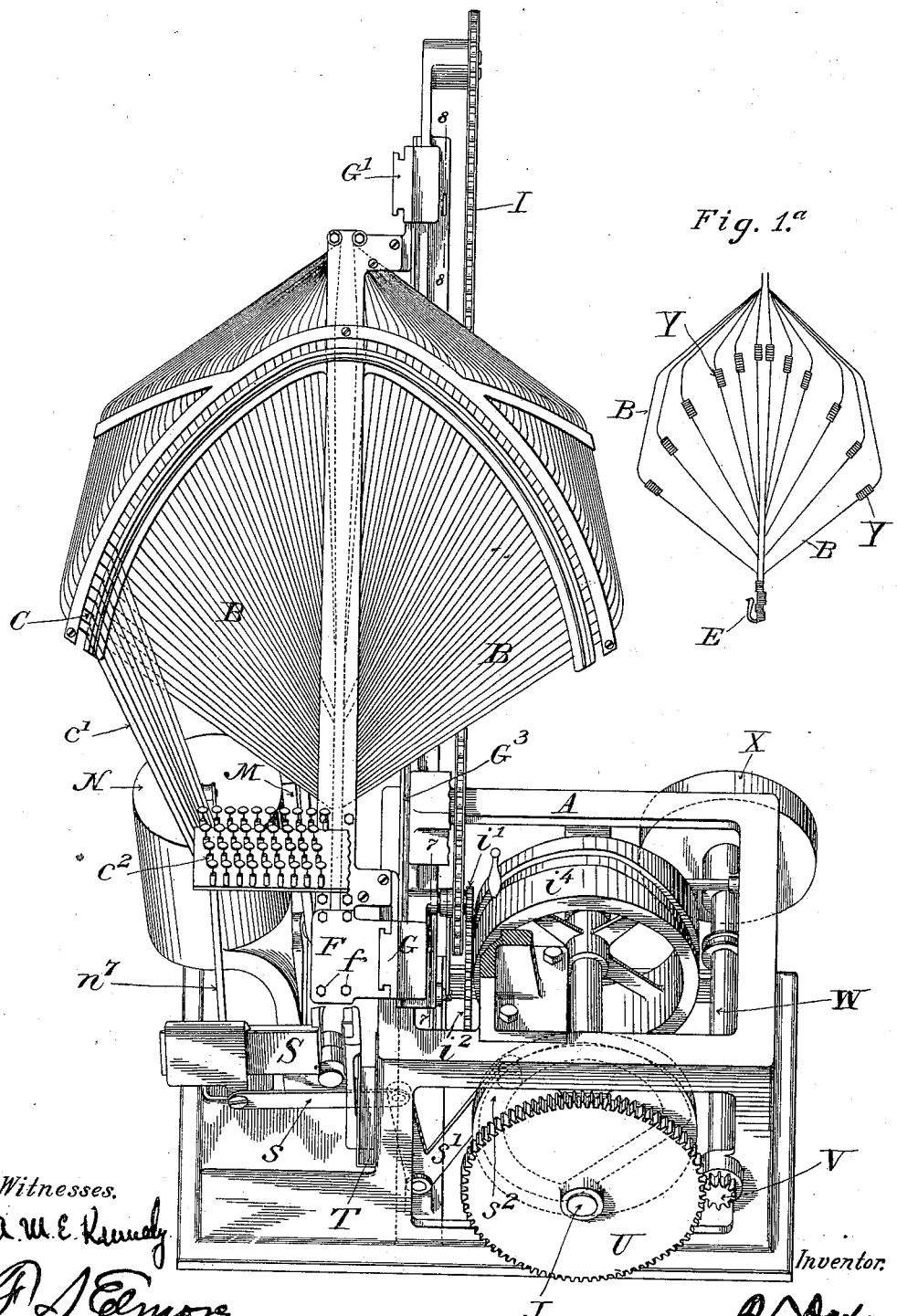

No. 685,035. Patented Oct. 22, 1901.
P. T. DODGE.
LINOTYPE MACHINE.
(Application filed May 28, 1901.)
(No Model.) 10 Sheets—Sheet I.

Fig. 1.ᵃ

Witnesses.
Inventor.

No. 685,035. Patented Oct. 22, 1901.
P. T. DODGE.
LINOTYPE MACHINE.
(Application filed May 28, 1901.)

(No Model.) 10 Sheets—Sheet 3.

Witnesses.
Inventor.

No. 685,035. Patented Oct. 22, 1901.
P. T. DODGE.
LINOTYPE MACHINE.
(Application filed May 28, 1901.)
(No Model.) 10 Sheets—Sheet 4.

Witnesses.
Inventor.

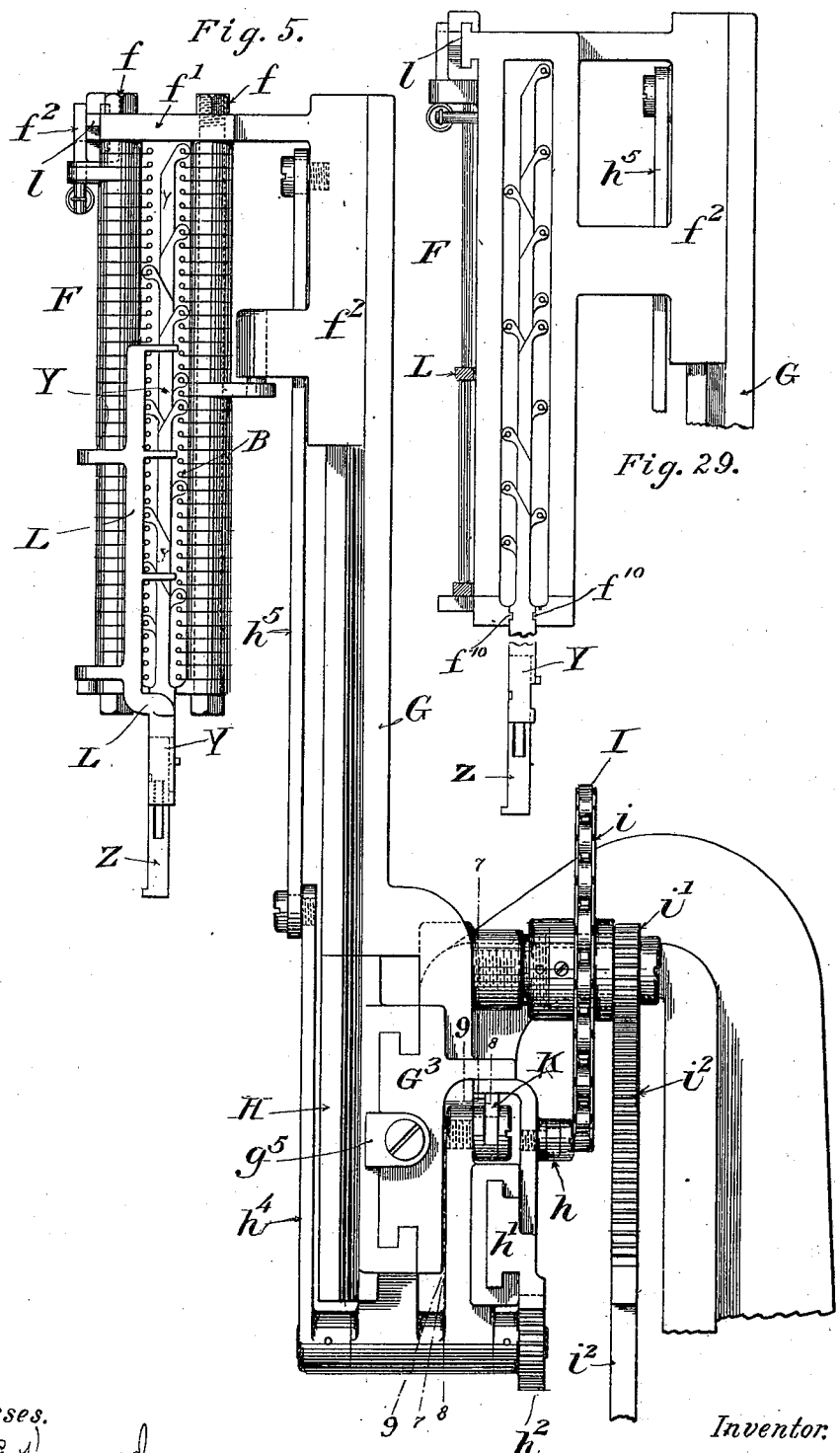

No. 685,035.  
P. T. DODGE.  
LINOTYPE MACHINE.  
(Application filed May 28, 1901.)  
Patented Oct. 22, 1901.
(No Model.)
10 Sheets—Sheet 6.
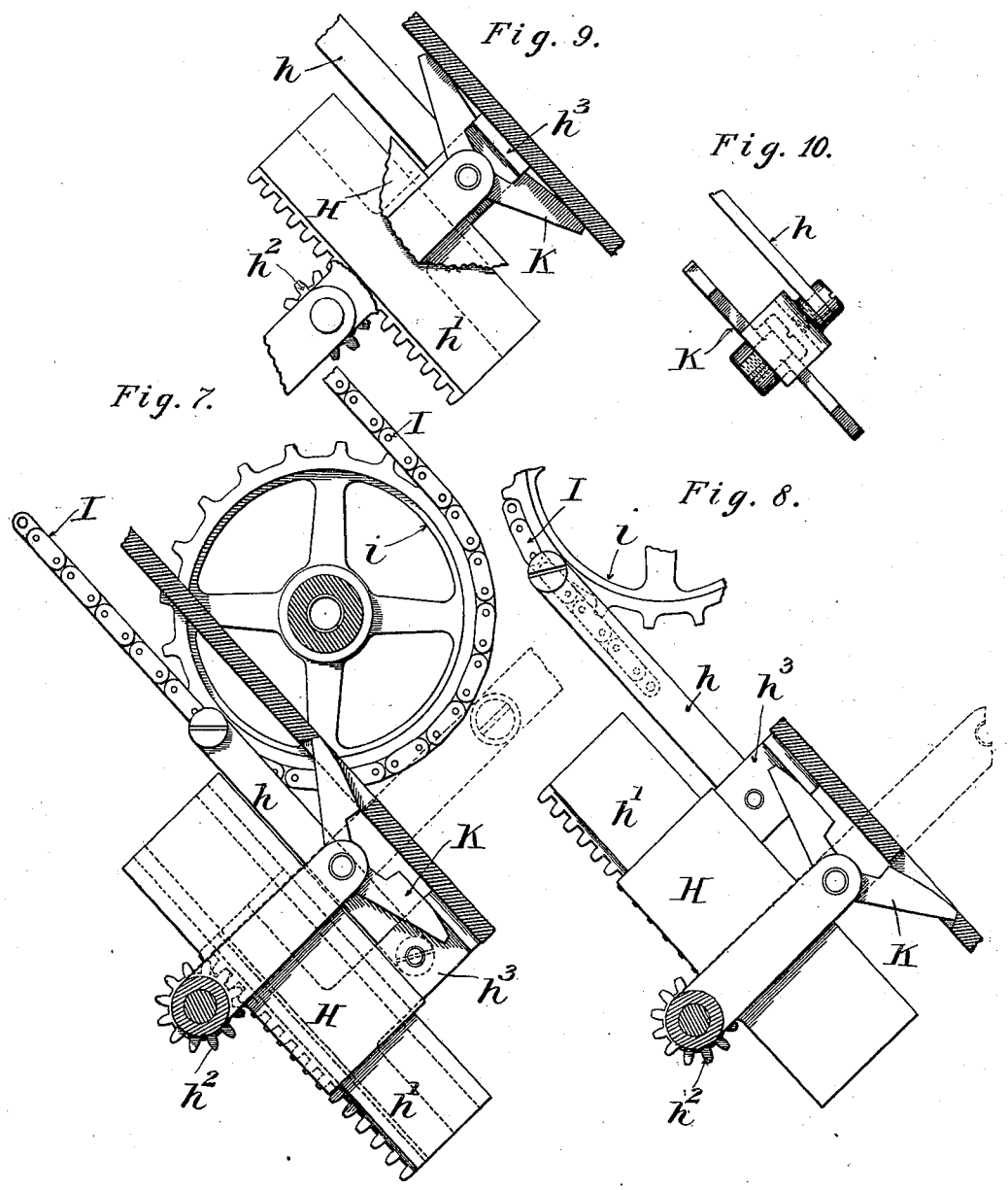
Witnesses.  
Inventor.

No. 685,035. Patented Oct. 22, 1901.
P. T. DODGE.
LINOTYPE MACHINE.
(Application filed May 28, 1901.)

(No Model.) 10 Sheets—Sheet 7.

Witnesses.
A. M. E. Kennedy.
F. S. Elmer.

Inventor.
P. T. Dodge.

THE NORRIS PETERS CO., PHOTO-LITHO., WASHINGTON, D. C.

No. 685,035.
P. T. DODGE.
LINOTYPE MACHINE.
(Application filed May 28, 1901.)
Patented Oct. 22, 1901.
(No Model.)
10 Sheets—Sheet 8.
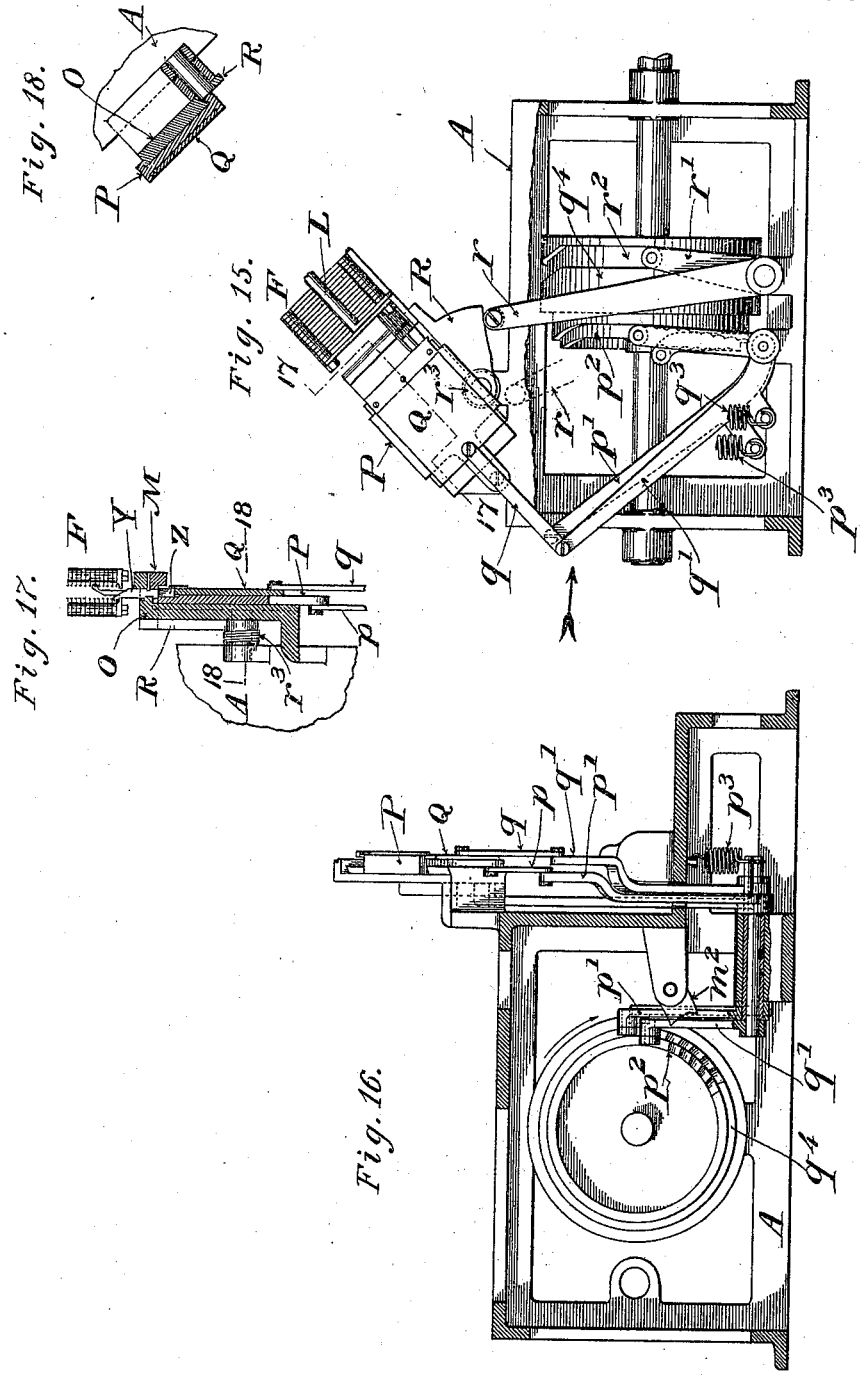
Witnesses.
A. M. E. Kennedy
P. S. Elmore
Inventor.
P. T. Dodge

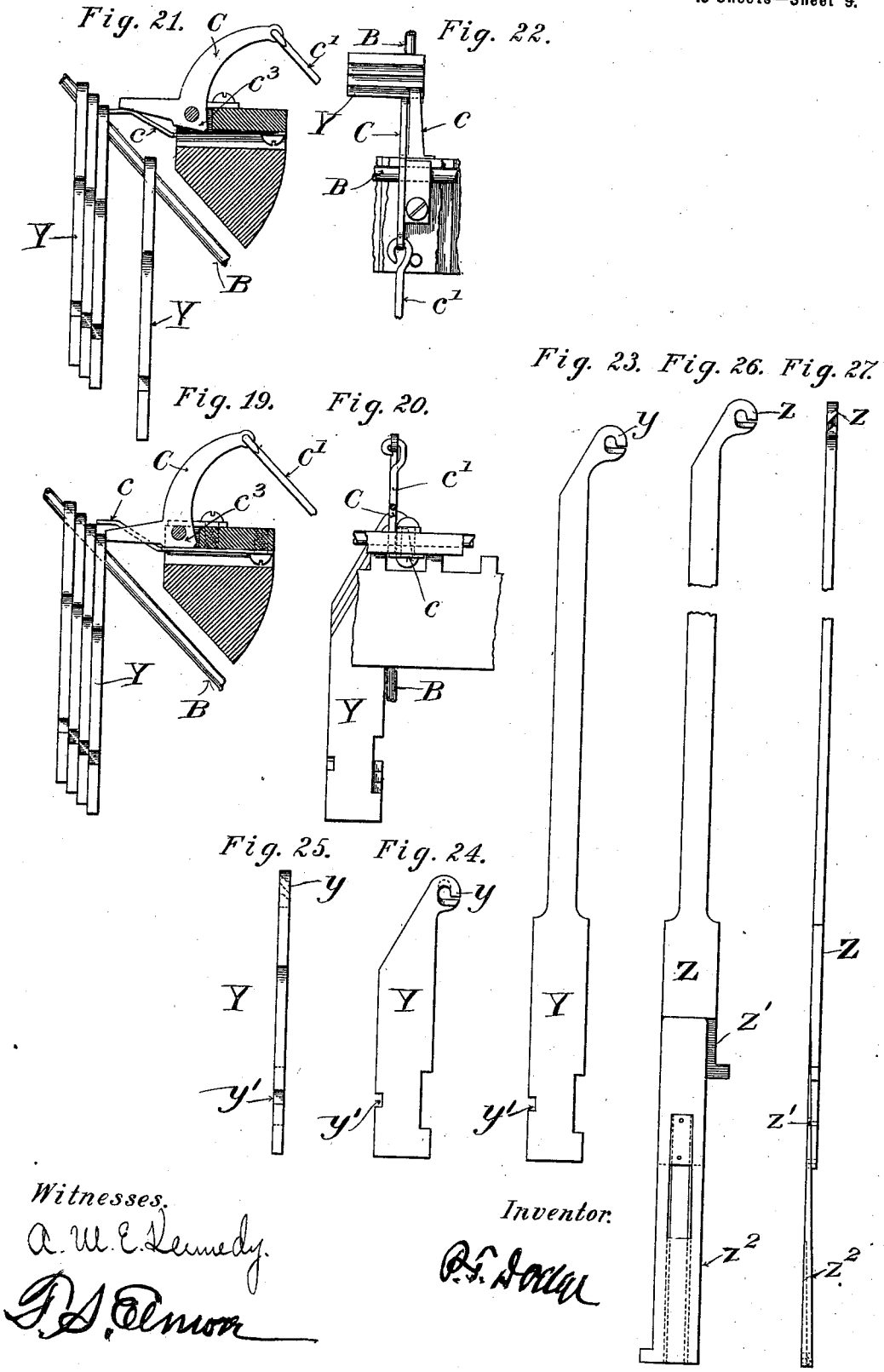

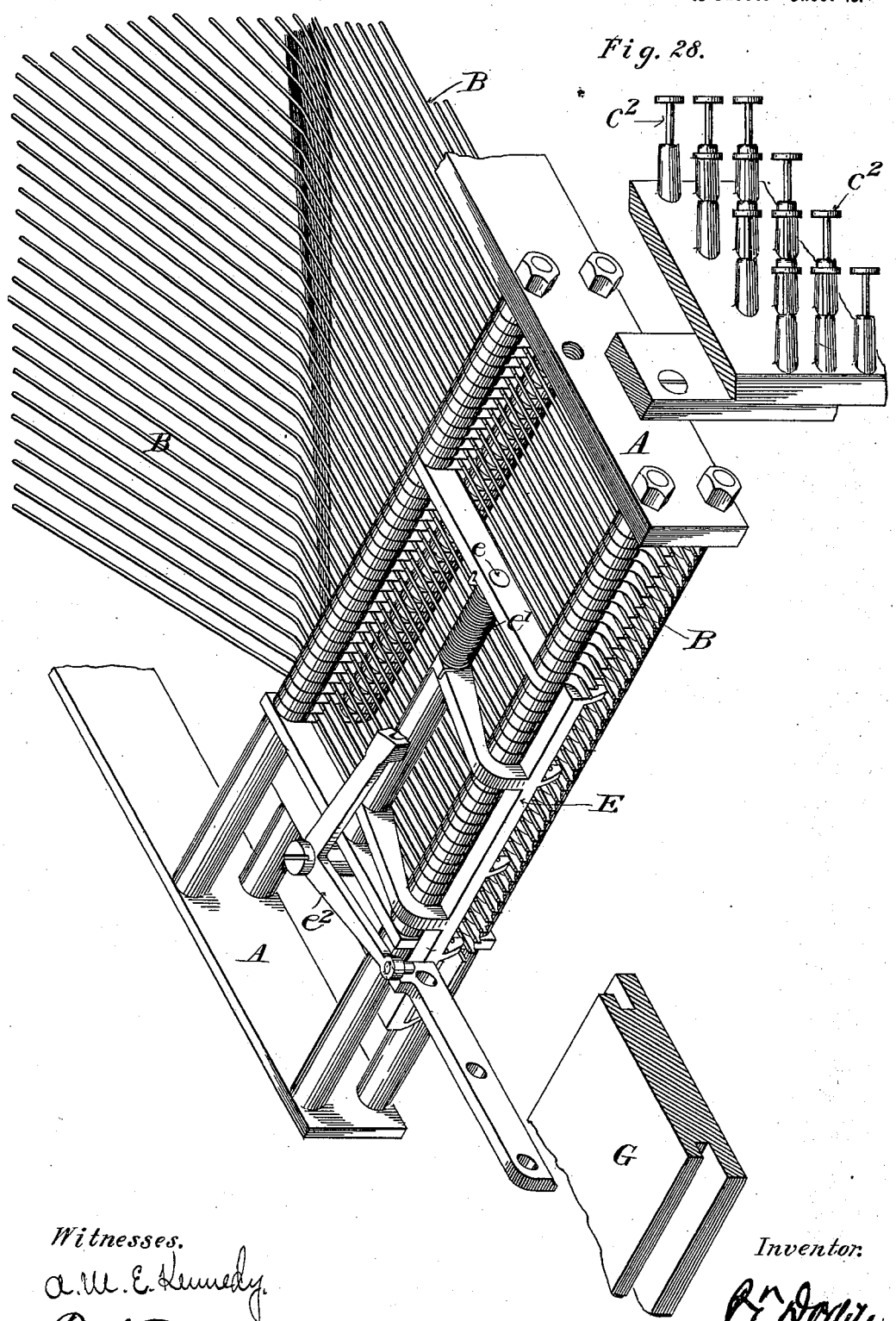

UNITED STATES PATENT OFFICE.

PHILIP T. DODGE, OF WASHINGTON, DISTRICT OF COLUMBIA, ASSIGNOR TO MERGENTHALER LINOTYPE COMPANY, A CORPORATION OF NEW YORK.

LINOTYPE-MACHINE.

SPECIFICATION forming part of Letters Patent No. 685,035, dated October 22, 1901.

Application filed May 28, 1901. Serial No. 62,274. (No model.)

*To all whom it may concern:*

Be it known that I, PHILIP T. DODGE, of Washington, District of Columbia, have invented a new and useful Improvement in Linotype-Machines, of which the following is a specification.

My invention relates to linotype-machines in which metallic matrices assembled temporarily in line in connection with suitable spacers in the order in which their characters are to appear in print are presented momentarily to the face of a slotted mold, which is filled with molten type-metal or equivalent material, to form a slug or linotype, on the edge of which the type characters are produced in relief by the matrices. It has reference particularly to that class of machines in which the individual matrices are suspended from and arranged to travel downward upon inclined wires or guides, the guides diverging from their upper ends toward the middle, where the matrices are held in reserve, and converging from the middle to the lower end, so that the composed line of matrices applied to the upper ends of the guides will be distributed as the matrices pass downward thereon to the middle portion, where they are held in reserve, and so, also, that the matrices released singly from the storage-points and traveling downward will be assembled by the guides in a common line preparatory to their coöperation with the casting mechanism.

My invention has reference more especially to means for transferring the composed lines from the lower ends of the guides automatically to their upper ends preparatory to distribution.

To this end it consists, broadly, in the combination, with guides, such as above described, or their equivalents, of means automatically acting to carry the composed line from the lower ends of the guides to the upper ends and for delivering them upon the latter.

It also consists in various minor features of construction hereinafter described.

Figure 2:
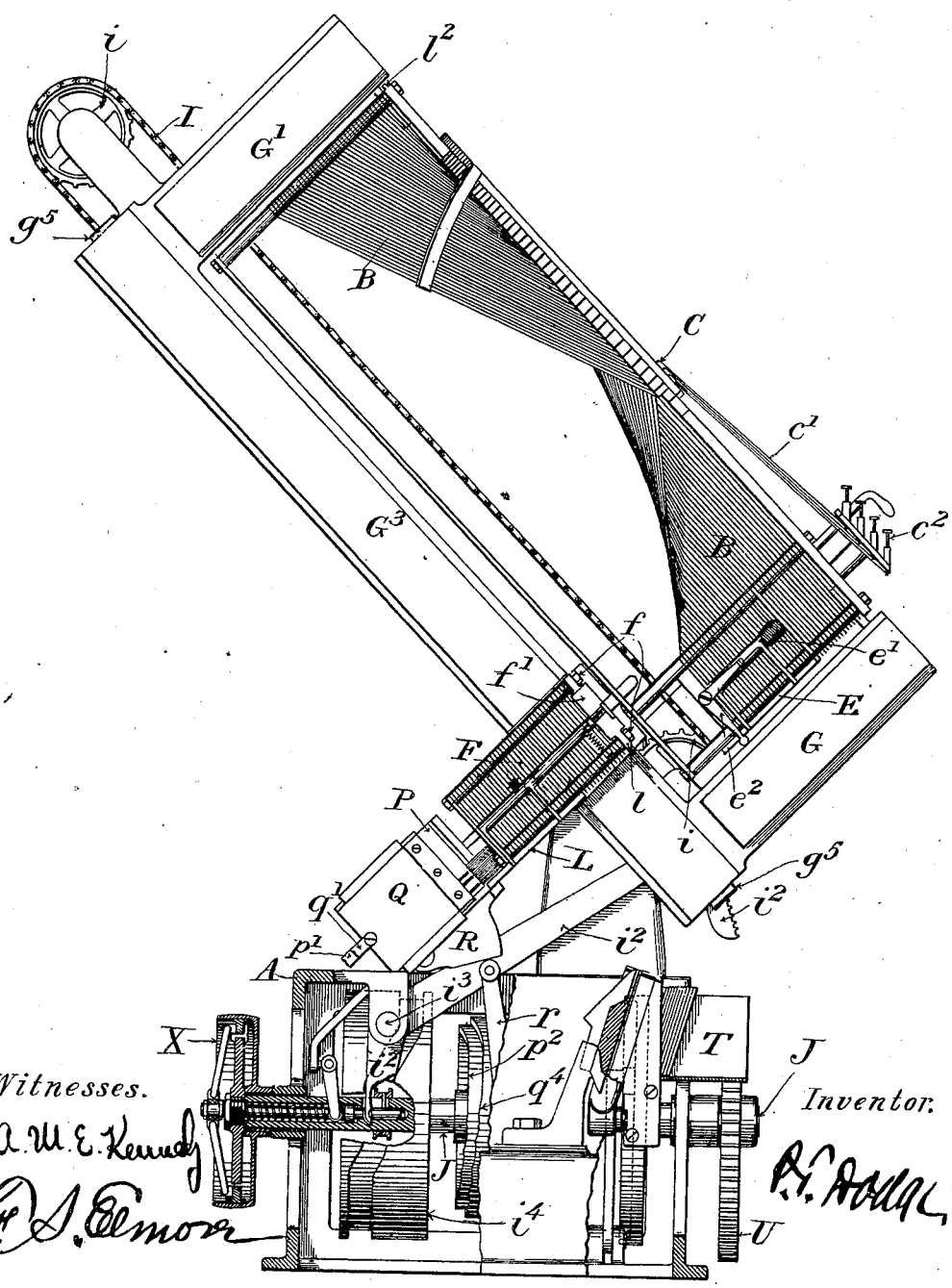
Figure 3:
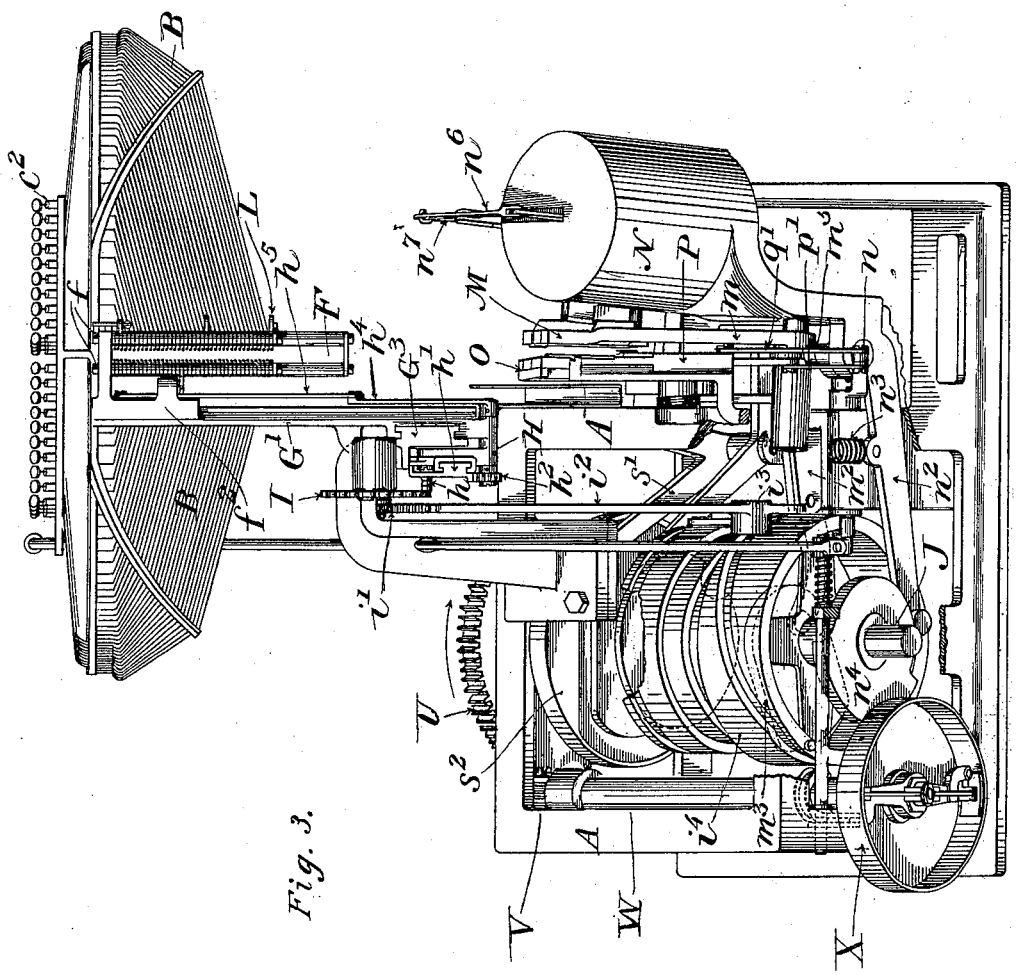
Figure 4:
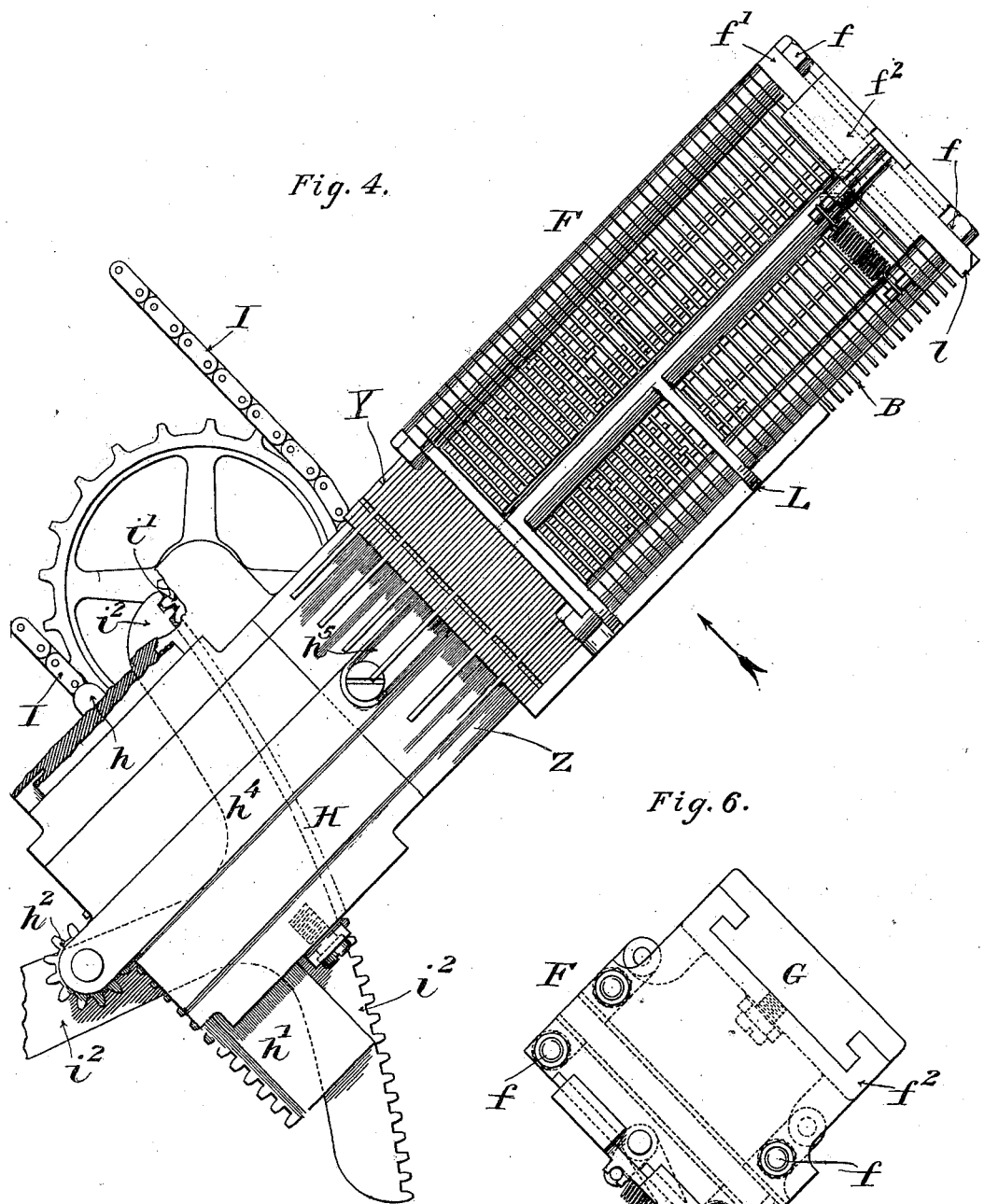
Figure 6:
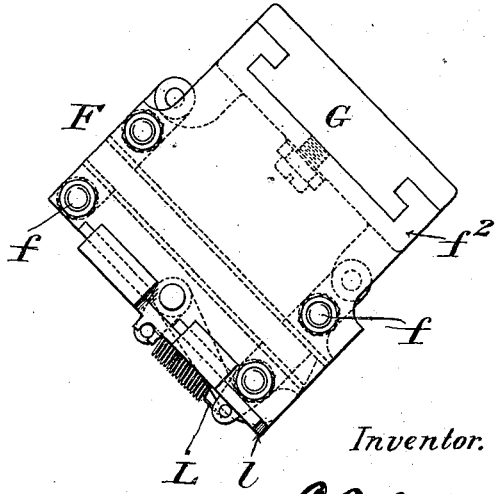
Figure 14:
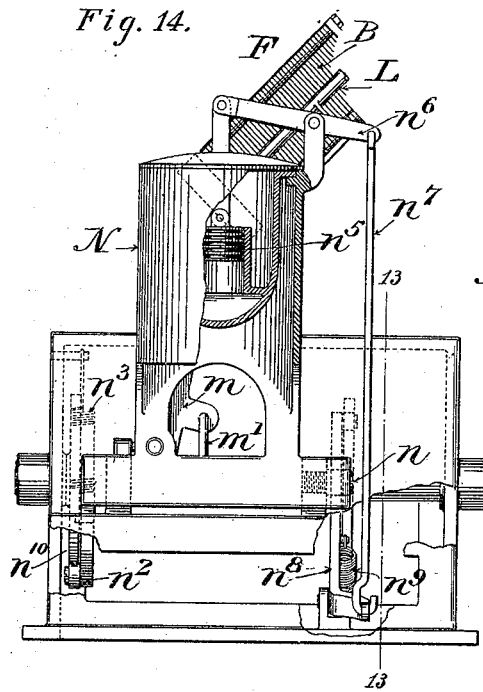
Figure 13:
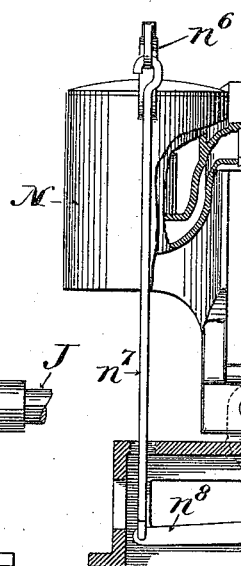
Figure 12:
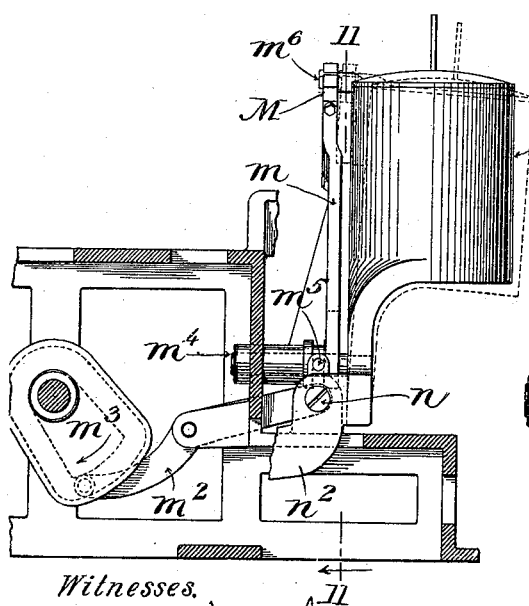
Figure 11:
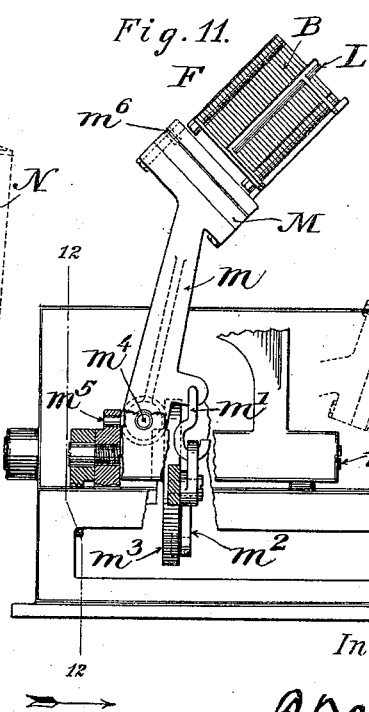

In the accompanying drawings, Figure 1 is a view looking in a downward and rearward direction against the top and front of my machine. Fig. 1ª is a diagram illustrating the general arrangement of the matrix-guides. Fig. 2 is a side elevation of the machine with portions of the framework broken away. Fig. 3 is a perspective view looking downward against the rear side of the machine. Fig. 4 is a side elevation showing the lower end of the carrier for the matrix-line. Fig. 5 is an elevation of the same looking in the direction indicated by the arrow in Fig. 4. Fig. 6 is a top plan view of the same. Figs. 7, 8, and 9 are vertical sections through the lower end of the carrier-operating devices on the correspondingly-numbered line of Fig. 5. Fig. 10 is a top plan view of the locking-dog shown in the three preceding figures. Fig. 11 is a cross-section on the correspondingly-numbered line of Fig, 12, illustrating the mold and attendant parts. Fig. 12 is a section on the line 12 12 of Fig. 11. Fig. 13 is a side elevation of the melting-pot and attendant parts, the frame being shown in section. Fig. 14 is a view of the parts shown in the preceding figure looking at right angles thereto. Fig. 15 is a side elevation of the matrix alining and justifying mechanism and attendant parts. Fig. 16 is a view looking in the direction of the arrow in Fig. 15. Fig. 17 is a cross-section on the correspondingly-numbered line of Fig. 15. Fig. 18 is a cross-section on the correspondingly-numbered line of Fig. 17. Fig. 19 is a vertical section through one of the escapements for releasing the matrices. Fig. 20 is a side view of the same. Fig. 21 is a cross-section of the escapement in a different position in the act of releasing the matrix. Fig. 22 is a top view of the same. Fig. 23 is a side view of one of the longer matrices. Figs. 24 and 25, respectively, are a side view and an edge view of a shorter matrix; Figs. 26 and 27, respectively, a side view and an edge view of one of the spacers or justifiers. Fig. 28 is a perspective view showing the lower ends of the matrix-guides. Fig. 29 is a cross-section of the matrix-carrier in a modified form.

As the basis of my machine I employ a series of matrices Y, such as shown in Figs. 23, 24, and 25, and a series of spacers Z, such as shown in Figs. 26 and 27. Each matrix consists simply of an elongated body having a thin upper end or shank with a suspending-hook $y$ at the top and a flat lower end with the letter or matrix proper, $y'$, in one edge. These matrices are all made of equal width from one edge to the other, but of different lengths, so that when suspended from the guide-wires at different heights the letters in their lower ends will stand at a common level in order that they may aline when the matrices are composed or assembled. Each spacer Z consists of the stem or shank having a suspending-hook $z$ at the upper end and a beveled or wedge-like surface $z'$ at the lower end and of the reversely-inclined wedge $z^2$, connected to the other by a dovetail joint, so that as the lower member is moved upward along the other the thickness of the space at the operative or casting point will be increased in a manner well known in the art. The spacers are all made of one length and of the same width as the matrices with which they coöperate to effect the justification or elongation of the composed line.

The machine proper designed to handle the matrices and spacers is constructed as follows:

A is a rigid main frame, which may be of any form or construction adapted to sustain the operative parts hereinafter explained.

B B are a series of stationary wire guides on which the matrices are suspended and by which they are assembled or composed in line in the order of selection and thereafter distributed. These wire guides, each of which is preferably continuous from end to end, may be supported on the main frame in the manner shown or in any other suitable manner. All of the guides are inclined from their upper to their lower ends, so that a matrix applied at the upper end will travel over the guide by gravity to the lower end. There are two series of guides symmetrically arranged on opposite sides of the median line. All of the guides in each series—that is, on each side of the machine—terminate at the upper end in a vertical row or rank, one above another, and at the lower ends the guides have a like arrangement, so that an assembled line of matrices removed from the lower ends of the guides may be applied to their upper ends preparatory to distribution. At their upper and lower ends the two series of guides stand in vertical parallel tiers, so that the composed group or row of matrices will stand between the ends of the two series of guides, as in the Rogers and Forth machines, well known in the art and represented in various Letters Patent. The guides are bent or deflected at the middle to the right and left of the central line, the respective guides in each series being deflected different distances, so that as the matrices bearing different characters descend the guides from the upper ends toward the middle they will follow diverging paths, and thus be distributed as they approach the storage-points or points of retention on the guides. Upon each guide, forward of the point at which the group of matrices is held in storage or reserve, there is located an escapement device connected with a finger-key, so that when the key is actuated a single matrix will be released and permitted to slide down the guide to the lower end, where it will join its predecessors in the course of composition.

The preferred form of escapement, as shown in Figs. 20 to 22, consists of an angular lever C, mounted on a horizontal pivot and arranged to engage at its rear end in front of the foremost matrix, and of a vertically-movable spring $c$, fixed to the frame and arranged to stand normally above and forward of the second matrix on the guide, as plainly shown in Fig. 19. The escapement-lever C is connected by a wire $c'$ with the vertically-sliding finger-key $c^2$ at the front of the machine, so that when the key is depressed the rear end of the lever will be raised clear of the foremost matrix, permitting it to escape and descend the guide, as shown in Fig. 21. The lever C is formed with a shoulder $c^3$, bearing on the detaining-spring $c$, so that when the lever is moved to release the foremost matrix it depresses the spring until the latter engages and holds the second matrix, as seen in Fig. 21. When the lever resumes its original position under the influence of the spring, it permits the spring to rise and release the matrix held by it, and at the same instant the lever descends into position to arrest this matrix, which is in the meantime moved forward and downward to the position previously occupied by the preceding matrix. Thus it will be seen that a single matrix is released by each movement of the lever. The successive matrices descending, the respective guides rest one against another and are held in the form of a compact line between the lower parallel ends of the guides by a detent E, consisting simply of a skeleton frame mounted on the upright pivot $e$ and having a series of fingers to lie across the path of the matrices, as shown in Fig. 28. The detent is held normally in its operative position by an encircling spring $e'$ and is retracted when the completed line is to be delivered from the lower ends of the guides by an elbow-lever $e^2$, pivoted to the frame, as shown in Fig. 28. After the composition of the line is completed it is delivered from the lower ends of the guides and transferred to the casting mechanism, while the composition of the second line proceeds between the guides.

For the purpose of carrying the composed line to the casting mechanism and thence to the upper ends of the guides for distribution I employ a carrier F, which may be constructed in any form adapted to receive and sustain the assembled matrices. In the form shown it consists simply of two ranks or tiers of guides corresponding in form and arrangement to the lower ends of the main guides B, so that as the line of matrices is permitted to slide off from the lower ends of the main guides the hooks at their upper ends will be transferred to corresponding guides in the carrier, as plainly shown in Fig. 4. The carrier is open at the lower end, so that the matrices and spacers may hang down between and beyond its guides to coöperate with the casting and justifying devices, as shown particularly in Figs. 2, 4, 15, &c. The guides of the carrier are connected to end plates or washers tied together by upright bolts $f$, secured at the top to a supporting plate or flange $f'$ on the upper end of a sustaining-slide $f^2$. This carrier-sustaining slide $f^2$ is designed to travel upward and downward alternately on two fixed guides G and G', located, respectively, at the lower and upper ends of the main guides B. When the carrier-slide is on the lower guide G, the carrier will be sustained at the lower ends of the main guides B in position to receive the assembled matrices therefrom. When, on the contrary, the carrier is on the upper guide G', it will be in position to deliver the composed matrices to the upper ends of the main guides B for distribution. In order that the carrier, with the contained matrices, may be transferred from the lower to the upper guide and sustained in position at an intermediate point during the casting operation, a fixed longitudinal guide $G^3$ is provided, and on this guide there is mounted a slide H. (See Figs. 4, 5, &c.) This slide H is arranged to travel lengthwise of the guide $G^3$ and is provided with a short guide or portion of the same sectional form as the guides G and G', so that when brought under either one of the last-named guides it will form a continuation thereof, so that the carrier-supporting slide descending from the guide G would be received by and sustained upon the smaller slide H, whereby it may be carried along the guide $G^3$ to the upper end, after which the carrier-slide may be raised to the guide G'. In other words, the secondary slide H serves as a means for supporting the carrier during its travel between the upper and lower ends of the main guides and for directing its course to and from the upright guides G and G'. The guide $G^3$ is preferably provided with end lips $g^5$, as shown in Figs. 2 and 5, or equivalent stops to positively limit the travel of the slide H at the proper point. The reciprocating movement of the carrier-supporting slide H along the guide $G^3$ is effected by an endless chain I, extended around supporting-pulleys $i$ on the main frame and actuated, as shown in Fig. 4, by pinion $i'$, attached to one of the sustaining-plates and actuated by a sector-rack $i^2$, mounted on a fixed pivot $i^3$, as shown in Fig. 2, and actuated by a stud or roller at its lower end below its pivot entering a grooved cam-wheel $i^4$, mounted on the main shaft J. This shaft is seated horizontally in the main frame and carries all the cams for operating the various parts of the machine. The chain I is not attached directly to the slide H; but, as shown in Figs. 5, 7, 8, 9, &c., it is connected by link $h$ to an arm on a rack-bar $h'$, arranged to slide lengthwise within the slide H to a limited extent. The rack $h'$ engages the pinion $h^2$ on a shaft mounted in the slide H, this shaft being provided, as shown in Figs. 3, 5, 7, &c., with a crank-arm $h^4$, connected by link $h^5$ to the carrier F, so that when the slide H stands under either the lower guide G or the upper guide G' the rotation of the pinion and crank will serve to raise and lower the carrier F, which is thus caused to aline with the upper or the lower ends of the main guides or to fall below the level of the guides that it may travel between their ends. When the carrier is to be raised and lowered on either of the upright guides G or G', it is obvious that its supporting-slide H must be locked for the time being in position. This is effected by the construction shown in Figs. 5, 7, 8, 9, &c., in which it will be seen that the slide H carries on a horizontal pivot therein a double-ended locking-dog K. When the carrier F and slide H are at the lower or forward end of the machine, the upper end of the dog K enters a notch in the frame and holds the parts in position, as shown in Fig. 7, thereby locking the slide H in such position that the carrier-slide may rise therefrom along the guide G to aline with the lower ends of the main guides B to receive the matrix-line therefrom. When, on the contrary, the slide H and the carrier F are at the upper end of the machine, the lower end of the dog K engages a notch in the frame, as shown in Fig. 8, thus holding the parts in such position that the carrier F may rise along the guide G' to register with the upper ends of the main guides B in order to deliver the matrices thereto for the purposes of distribution. The dog K is actuated by an arm $h^3$ on the upper end of the rack-bar $h'$, as follows: While the slide is traveling lengthwise of the main guide $G^3$ the dog K straddles and embraces the arm $h^3$ on the rack, as shown in Fig. 9, so that the rack, the slide H, and the carrier F thereon move together upward or downward along the guide $G^3$, as the case may be. When the slide H reaches the lower end of the guide $G^3$, as shown in Fig. 7, it can move no farther; but the chain continues its motion, causing the rack-bar $h'$ to slide forward to the right, as shown in Fig. 7, whereupon the upper end of the arm $h^3$, overriding the lower end of the dog, causes its upper end to engage in the frame, as shown in Fig. 7, while at the same time the rack serves to rotate the pinion $h^2$ and through the connecting-crank $h^4$ lift the carrier F to the lower ends of the main matrix-guides. When the motion of the chain is reversed, the rack $h'$ moves to the left through the slide H, lowering the matrix-carrier to the level of the longitudinal guide $G^3$, and at the same time unlocking the dog K, so that the chain and link may move the carrier along the guide $G^3$ toward the upper end of the machine. When the carrier arrives at the upper end of the machine, the action of the parts is similar to that at the lower end, the rack continuing its motion through the slide H after the latter is arrested, so that the locking-dog is caused to engage and the pinion and crank caused to lift the matrix-carrier F to the upper ends of the guides B. The chain-actuating cam $i^4$ has its groove made of such form that the chain is stopped and the matrix-carrier F arrested during its upward and rearward travel at the point shown in Fig. 2 in order that the matrices and spacers may coöperate with the casting mechanism, after which the motion of the carrier is continued rearward and upward to deliver the matrices for distribution. When the line of matrices is received from the lower end of the guides B into the carrier F, they must be prevented from sliding through the latter; but when the carrier is in position at the upper ends of the guides B the matrices must be released, that they may slide out of the carrier onto the guides. This is effected, as shown in Figs. 2, 4, 6, &c., by a swinging gate or detent L, similar in form and action to the gate or detent E at the lower ends of the matrix-guides B. This carrier-gate L, mounted on an upright axis, has a series of fingers which lie normally across the lower or forward side of the carrier, so that when the matrices are received in the latter they will be arrested by the fingers of the guide and held from escaping. A spring holds this guide normally in a closed position; but when the carrier reaches the upper end of the machine a transverse slide $l$, mounted in the upper end of the carrier, engaging an arm on the gate, contacts at one end with a projection $l^2$ on the frame, as shown in Fig. 2, thereby causing the gate L to open automatically, so that the matrices are delivered by gravity from the carrier F to the upper ends of the guides B.

The casting mechanism with which the matrices coöperate consists principally of means for confining the matrix-line, a mold M, in which the slug or linotype is cast, and a melting-pot N, from which molten metal is delivered into the slotted mold. The mold M, in the usual slotted form, is carried by the upper end of a vibrating arm $m$, (see Figs. 11 and 12,) mounted on a horizontal pivot and actuated through link $m'$ from the lever $m^2$, pivoted in the main frame and having a stud or roller seated in a grooved cam $m^3$ on the main shaft J. The melting-pot N, having a mouth to close the rear face of the mold and deliver metal thereto, is mounted at its base on a horizontal pivot $n$, so that it may swing to and from the line of matrices while the latter is held at rest in the position shown in Fig. 2, &c. The swinging motion of the pot is effected, as shown in Figs. 13 and 14, by an arm or projection $n^2$ at its lower end moved in one direction by a spring $n^3$ and in the opposite direction by a cam $n^4$. The cam serves to swing the pot forward against the mold in order to crowd the latter in turn against the matrix-line on the opposite side, and when the cam relieves the parts from pressure the spring causes the parts to swing backward. The pivot $m^4$, on which the mold-arm swings, is fixed on the base of the pot, so that the mold partakes of the swinging motion of the pot to and from the matrices, this in order that the mold may close tightly against the matrices and that it may draw the slug or linotype away from the matrices after the casting action. It is necessary, however, that after the casting operation the mold should also be separated from the pot in order to break the base of the slug away from the sprues in the mouth of the pot, so that the mold may swing laterally away from the casting position to a position permitting the ejection of the slug therefrom. This movement of the mold to and from the pot is effected by permitting the mold-arm to slide lengthwise of its pivot $m^4$ (see Fig. 12) and by providing a fixed arm $m^5$ with a stud to enter the groove in the hub of the mold-arm, as shown in Figs. 11 and 12, so that as the pot swings backward the mold-arm will be slightly separated therefrom by the arm $m^5$. During the casting operation the matrices must be held edgewise against the mold, the line of matrices clamped endwise to limit its elongation, and the spacing-wedges actuated to effect the elongation or justification. To this end there is on the main frame, as shown in Fig. 17, a surface or anvil O to bear against the rear edges of the matrices and spacers in opposition to the mold M, which bears against the forward edges. Each matrix has in the rear edge a notch which is entered by the anvil. Below the position occupied by the matrices there is a reciprocating slide P, which, pressing upward at the proper time, determines the longitudinal adjustment of the matrices. A second slide Q in front of the first engages the lower ends of the wedge spacers to drive them upward through the matrix-line to effect the justification and to pull them down after the casting action to release the line. The alining-slide P is actuated by link $p$ and angular lever $p'$, mounted in the main frame and acted upon by the cam $p^2$ and spring $p^3$, the cam serving to retract the slide, while the spring, on the other hand, serves to advance it repeatedly against the lower ends of the matrices to establish and maintain their alinement. The justifying-slide Q is operated through link $q$ and an angular lever $q'$, also pivoted in the main frame and acted upon by a spring $q^3$ and cam $q^4$, serrated through a portion of its surface, whereby the justifying-slide is caused to advance the spacers by a succession of light strokes and after the casting action to withdraw the spacers in order to loosen the matrices between the end clamps.

For the purpose of clamping the matrix-line endwise and keeping it within the predetermined length while being justified I provide the mold with a stop-shoulder $m^6$ to arrest the upper or rear end of the matrix-line, as shown in Fig. 7, and on the frame I pivot, as shown in Fig. 15, a clamping-jaw R to act against the rear end of the matrix-line. This jaw is raised to its operative position, after the carrier F has brought the line to the casting position, by a lever $r$, pivoted in the main frame and acted upon by the grooved cam $r^2$. The upper end of this cam lever or roller thereon rides beneath the jaw R, as shown in Fig. 15, thereby raising it to its active position. When the lever moves to the left, it releases the jaw, which is depressed or bent by a spring $r^3$, applied as shown in Figs. 15 and 17.

The melting-pot is provided, as usual in this class of machines and as shown in Fig. 14, with a piston or pump-plunger $n^5$, serving to deliver molten metal through the mouth of the pot into the mold. This plunger is actuated through a link on lever $n^6$, connected by rod $n^7$ to lever $n^8$, mounted in the base-frame and acted upon by the spring $n^9$, which serves to depress the plunger, and by a cam $n^{10}$ on the main shaft, which serves to lift the plunger. After the casting action and after the pot has separated from the mold and the mold separated from the matrices the latter swings downward to the position indicated by dotted lines in Fig. 11, thereby presenting the contained slug in front of the ejector-blade S, (see Fig. 1,) which advances and drives the slug out of the mold between the customary trimming-knives into the receiving-galley T. The ejector is mounted to travel on a guide in the frame and is operated, as shown in Fig. 1, by a link $s$, connected to an angular lever $s'$, having a roller seated in a grooved cam $s^2$ on the main shaft. Motion is communicated to the main shaft J by a gear-wheel U, mounted on one end thereof and driven by a pinion V on a shaft W, provided with a driving-pulley X and with a clutch mechanism of any ordinary construction, through which the main shaft may be arrested at will. This clutch mechanism, not being of the essence of my invention, is not described herein.

The operation of my machine is as follows: The matrices and spacers, being suspended on their appropriate guides B and held in reserve by the escapements C, are released in the required order by the manipulation of the finger-keys $c^2$, which actuate the escapements. The matrices and spacers, being thus released, descend the lower portions of the guides B and are assembled side by side in line between the lower parallel ends of the guides, where they are held by the gate or detent E. The endless chain I through the intermediate parts raises the carrier F into position to register with the lower ends of guides B, and as the carrier reaches its final position a projection in its lower end, acting through the lever $e^2$, Fig. 28, opens the gate E, whereupon the matrices slide forward from the guides B into the carrier F, in which they are arrested by its gate L. As the motion of the chain continues the carrier F, containing the matrices, is lowered by crank $h^4$, Figs. 4, 5, &c., to the slide H, which is then moved upward and rearward along the guide $G^3$ until the matrices are brought to the casting position, when the carrier stops. The jaw R closes behind the matrix-line, and the mold and pot advance toward the line, so that the matrices are clamped between the mold at the front and the supporting-anvil at the rear and so that the mouth of the pot is closed against the front of the mold. During this action and preferably before the final clamping of the matrices is effected the slide O rises to effect their longitudinal alinement and the slide P acts to effect the justification. The parts being locked tightly in position and remaining at rest for the moment, the plunger acts and fills the mold with molten metal, producing the slug or linotype, on which the characters are formed by the matrices. The several members now retreat, the slide Q pulling down the spacers to loosen the line, the slide P releasing the lower ends of the matrices, and the mold and pot retreating from the matrices and separating from each other. The mold swings down endwise, and the ejector advances and delivers the slug therefrom. As soon as the matrices are released the chain I continues its motion and the matrix-carrier is moved along the guide $G^3$ to the upper end of the machine, and then up the guide G to the upper ends of the matrix-guides B, and at the same time that this occurs the carrier-guide L is open and the matrices permitted to slide out of the carrier onto the upper ends of the guides. It will be observed that under my organization of parts the composition of one line may be carried on while the casting or distribution of the preceding line is progressing.

While I have described herein those details of construction which I prefer to employ, it is manifest that they may be widely varied without departing from the limits of my invention.

While I prefer to construct the converging or matrix-assembling portions of the guides in one piece with or as continuations of the diverging or distributing portions of the guides, it is obvious that this is not essential, as the distributing and assembling guides may be separately constructed and arranged to deliver one to the other after the manner shown in the United States patent of Forth, No. 562,954, or the United States patent to Bell, No. 578,713. I also prefer to arrange my guides with their delivering and receiving ends extended in reverse directions, so that the matrices received on the upper ends continue their course in one direction during distribution and assemblage; but manifestly the distributing portion may have a downward inclination from one direction and the assembling portion an inclination in a reverse direction, as shown, for example, in the Bell patent, above referred to.

While I prefer to construct the carrier with a series of guides corresponding in arrangement with the ends of the main guides B, so that the assembled matrices transferred from the main guides will be each supported at the upper end in the carrier, as on the main guide B, the only essential requirement is that the carrier shall be adapted to receive the matrices on one side and deliver them on the other and that it shall sustain the matrices so that their lower or operative portions may be exposed to the casting mechanism, and the details may be modified at will, provided these characteristics are retained.

In Fig. 29 I have illustrated a modified construction of the carrier in which its walls are provided each on the inner surface with a single rib or guide $f^{10}$, adapted to enter corresponding notches made for the purpose in the matrices. These ribs and notches will manifestly sustain the matrices in the same relations in which they were assembled and maintained from upper and hooked ends at such heights that when transferred to the guides each matrix will pass upon its proper guide.

Having described my invention, what I claim is—

1. In a linotype-machine, the combination of inclined distributing and assembling guides, matrices suspended thereon to descend by gravity, a carrier for the composed line of matrices, and automatic devices cooperating with the carrier to effect its alinement alternately with the lower and the upper ends of the guides and the automatic delivery of the composed matrices from the lower ends of the guides to the carrier and from the carrier to the upper ends of the guides.

2. In a linotype-machine, the combination of a series of inclined guides, diverging substantially as described to effect the distribution and assemblage of the matrices, matrices suspended on said guides to descend by gravity, escapements controlling the descent of the matrices to the point of assemblage, a carrier for the composed line of matrices open on both sides that the line entering from one side may escape at the other, means for preventing the premature escape of the matrices from the carrier, and automatic mechanism whereby the carrier is presented to the lower ends of the guides to receive the matrices therefrom and thereafter presented to the upper ends of the guides to deliver the matrices thereto.

3. In a linotype-machine, a series of fixed inclined guides, grouped in like manner at their upper and their lower ends, and diverging between their ends to effect the distribution and assemblage of the matrices, escapements to control the passage of the matrices over the guides to the assembling-point, a movable gate or detent to retain the line of assembled matrices between the guides, a carrier adapted to receive the composed line of matrices and to register with the upper and lower ends of the guides, a gate or detent in said carrier to arrest the passage of the matrices therethrough, means for presenting the carrier alternately to the lower and the upper ends of the guides, means for actuating the gate or detent to permit the passage of the composed line into the carrier, and means for operating the carrier-gate that the matrices may pass therefrom to the upper ends of the guides.

4. In a linotype-machine, a series of inclined guides diverging from their upper ends for purposes of distribution and converging toward their lower ends for purposes of assemblage or composition, in combination with matrices suspended thereon to descend by gravity, a carrier adapted to receive the composed lines of matrices from the lower ends of the guides and deliver the same to the upper ends of the guides, a casting mechanism and mechanism for presenting the carrier successively to the lower ends of the guides, to the casting mechanism, and to the upper ends of the guides, substantially as described.

5. In a linotype-machine, a series of guides B, converging in a downward direction toward their forward ends and having said ends arranged in parallel planes, in combination with a movable gate or detent E to arrest and hold the matrices between the guides as they are assembled, and a carrier with inclined guides to receive and suspend the matrices.

6. In a linotype-machine, the matrix-sustaining guides B, converging in a downward direction toward the front and having their lower ends arranged in parallel tiers, that the matrices may be assembled between them, in combination with a movable gate or retaining device E to detain the composed line between the guides, and a matrix-carrier having a series of guides adapted to register with the lower ends of the guides B and to receive the assembled matrices for transportation to a casting mechanism.

7. In a linotype-machine, in combination with a series of matrix-sustaining guides B, having exposed parallel ends from which the assembled matrices may be delivered, a receiver F having guides adapted to register with the guides B and to receive the assembled matrices therefrom, said carrier open at the bottom, that the matrices may be exposed below it to coöperate with a casting mechanism.

8. In a linotype-machine, a series of guides B, having their upper and their lower ends arranged in parallel tiers and their middle portions separated for the purpose of distributing and assembling the matrices, a movable gate or detent E at the lower ends of said guides, a carrier F having guides to receive the assembled matrices and a movable gate or detent L to detain them therein, said carrier open at the bottom to expose the ends of the matrices below it, a casting mechanism comprising matrix-clamps, a mold, and a coöperating metal pot, and mechanism whereby the carrier is first presented to the lower ends of the guides B to receive the matrices, then advanced to present the lower ends of the matrices to the casting mechanism, and thereafter advanced to the upper ends of the guides to deliver the matrices thereto.

9. In a linotype-machine, inclined distributing and assembling guides B, having their upper and lower ends in parallel lines, in combination with a matrix-carrier F, upright guides G and G', a longitudinal guide G³, a slide H movable on guide G³, and mechanism substantially as shown for reciprocating the slide H on the longitudinal guide and for moving the carrier F from the slide H and to and from the guides G and G' alternately.

10. In combination with matrix distributing and assembling guides B, having exposed ends extending in opposite directions, a carrier F adapted to sustain a composed line of matrices, and mechanism, substantially as shown, acting to sustain the carrier in register with the lower ends of the guides to receive the matrices therefrom, and thereafter lower the said carrier lengthwise of the matrices, then move the carrier transversely of the matrices to the rear or upper ends of the guides B, and finally raise the carrier past the upper ends of the guides B until it registers therewith to deliver the matrices.

11. In a linotype-machine, the matrix-assembling guides with parallel lower ends, said guides inclined downward to their extremities, in combination with a carrier having correspondingly-inclined guides to receive the matrices by gravity.

12. In a linotype-machine, inclined guides arranged to assemble the matrices suspended therefrom, in combination with a gate or detent to hold the composed line temporarily on the guides, a carrier adapted to receive the matrix-line from the guides, a casting mechanism, and mechanism for advancing the carrier to convey the matrices from the guides to the casting mechanism.

13. In a linotype-machine, inclined fixed guides for assembling and distributing the matrices, in combination with matrices suspended thereon, escapements to release the matrices one at a time for assemblage, a carrier adapted to receive the assembled matrices, a casting mechanism below the level of the guides, and mechanism for lowering the carrier to transfer the assembled matrices from the guides to the casting mechanism.

14. In a linotype-machine, the inclined guides, the matrices suspended thereon, a carrier to receive the composed matrices, in combination with a slide H to receive said carrier, upright guides G G', an intermediate guide G³ whereon the slide is arranged to travel, and means substantially as described for moving the slide along the respective guides, substantially as shown.

15. In a linotype-machine and in combination with the guides, the matrix-carrier and the slide H to transport said carrier, the guides for said slide, the reciprocating chain, the rack connected to said chain and having a limited motion in the slide H, the pinion and crank connections mounted on the slide for raising and lowering the carrier, and means for locking the slide at the end of its movement.

16. In a linotype-machine and in combination with the matrix-carrier and the slide H for transporting the same, the independently-sliding rack and the pinion and crank mounted on the slide to raise and lower the carrier, the chain connected with the rack, and a locking device K actuated by the rack.

17. The combination of the inclined guide B, a series of pendent matrices thereon, an escapement-lever C having its end arranged to directly encounter and arrest the foremost matrix, and a spring c acting upon the escapement to effect its movement in one direction and extending above and beyond the lever to engage the second matrix in the line.

18. In a linotype-machine, the alining and justifying slides, in combination with the concentric levers for operating them, and concentric cams for actuating the levers.

19. In a linotype-machine, inclined distributing and assembling guides and matrices suspended thereon, in combination with a gate at the lower end of the guides to hold the assembled matrices, a carrier arranged to receive the matrices from the lower ends of the guides, a gate or detent to retain the matrices in the carrier, means for transferring the carrier and the contained matrices from the lower ends of the guides to their upper ends, and means for automatically actuating the gates to permit the passage of the matrices from the lower ends of the guides into the carrier and from the carrier to the upper ends of the guides.

In testimony whereof I hereunto set my hand, this 16th day of May, 1901, in the presence of two attesting witnesses.

PHILIP T. DODGE.

Witnesses:
W. A. McCALL,
JOHN F. GEORGE.